Patented Nov. 2, 1943

2,333,442

UNITED STATES PATENT OFFICE 2,333,442

PRODUCTION OF CANDY COATED PUFFED CEREALS

James S. Rex, Chester, Pa., assignor to Ranger Joe, Inc., Chester, Pa., a corporation of Pennsylvania No Drawing. Application February 11, 1943, Serial No. 475,535

8 Claims. (Cl. 99—83)

This invention relates to the production of a candy coated puffed cereal product which is highly palatable and tasty and which possesses excellent keeping qualities.

This application is a continuation-in-part of my application Serial No. 394,515, filed May 21, 1941.

It is the object of the present invention to coat a puffed cereal product with a honey flavored candy coating in such a manner that a thin hardened film of the coating covers each grain of the cereal, which coating maintains its original texture for indefinitely long periods of time without disintegration or conversion into any other form of sugar.

It is a further object of the invention to provide a process for coating puffed cereal grains with a candy product which is executed quickly and expeditiously and which gives rise to a separation of the individual grains immediately subsequently to the coating operation, which separation is maintained in the course of storage of the cereal grains incident to the distribution and marketing thereof for ultimate consumption. The body as well as the coating of the puffed cereal retain their crispness and good taste indefinitely when the product is packaged properly.

The invention proceeds upon the principle of combining a puffed cereal grain, such as puffed wheat or puffed rice, with a candy coating, under critical conditions, with the two constituents possessive of specific critical characteristics, so that an intimate and complete coating of candy upon the grain may be executed followed by a rapid embrittling of the coating, which is effective in causing a separation of the individually coated grains and simultaneously completing the formation of a lasting and hard layer of the protective coating upon the individual grains which is not affected by time.

The invention comprehends the treatment of puffed cereal grain having a critical moisture content and furthermore a grain to which a candy coating may adhere effectively. The candy coating, which is preferably a sugar composition flavored with honey, incorporates a critical quantity of hardening agents so that the candy mass is sufficiently fluid at high temperatures ranging from 310° F. to 340° F. to effectively coat the individual cereal grains to which the liquid mass is added, in a short period of time without excessive mixing, and yet will harden instantaneously upon chilling to a lower temperature. Following the rapid and intimate mixture of the candy mass with the cereal grain, the coated product is introduced into an air conditioned chamber maintained at a critical temperature ranging from 75° to 70° F. with a controlled relative humidity of from 35% to 30%, whereupon the sudden cooling of the mass results in the embrittling of the thin coatings upon the cereal grains, which results in a crackling action incident to the hardening of the coatings on the individual grains and the separation thereof from each other. Thereupon the coated puffed cereal grains are packaged under the same atmospheric conditions as those in which the separation takes place, in containers which are hermetically sealed. This mode of packaging results in the sealing of the original flavors of the product within the containers, which product suffers no deterioration in respect to either the coating on the cereal grains or to the flavors of the grains themselves, which are additionally sealed in by the coating.

The invention is exemplified by one preferred embodiment thereof involving the preparation of a candy coated puffed wheat which is prepared as follows:

A bran-covered puffed wheat of elongated outline having a moisture content less than 8% is used in order to provide an effective body to which the honey flavored coating may adhere, which is furnished by the bran covering. The candy formula which is highly palatable and tasty and which possesses the hardening characteristics described above, is prepared for intimate intermixture with the bran-covered puffed wheat. This formula is preferably compounded by using approximately twenty pounds of sugar in one quart of water to which is added approximately two pounds of amber honey for the purpose of flavoring the candy. Suitable hardening agents are added to the composition, such as approximately six ounces of acetic acid supplemented by a solid hardening agent such as approximately two ounces of sodium acetate crystals. The flavor of the composition may be seasoned by the addition of approximately two ounces of salt thereto. The mixture is mixed thoroughly, brought to a boil and is heated for approximately 20 minutes to bring it to a temperature ranging from 310° F. to 340° F. This temperature is controlled variably depending upon the relative humidity of the surrounding atmosphere. In the cases of high humidity, the temperature attained by the mixture before use is approximately 340° F. while at low humidity a temperature of 310° F. suffices. Thus the higher temperature compensates for the larger proportion of moisture, which must be maintained below a critical limit so that the coating will harden in response to the air chilling thereof.

The formula prepared as described above is added in its highly heated state and in ribbon form as the same is poured from the heating kettle to approximately fourteen pounds of the puffed wheat disposed in a rotary mixer in the form of a cylindrical tub of approximately 36" diameter, having about six downwardly extending mixing arms which are motor driven and which operate to agitate the cereal grains for intermixture with the hot liquid candy composition in less than two minutes, or more specifically in one to one and a half minutes. This mixing operation is executed at normal room temperature conditions. The tubs are covered in the course of the agitation to retain the cereal grains in the tubs during this brief period. Thereafter, the contents of the tub, consisting of lumped masses of the coated cereal grains as the same are developed by the stirring action of the agitator arms of the tub are discharged through a hopper into an air conditioned chamber which is maintained at a critical temperature and humidity. The atmospheric conditions in this chamber range from temperatures of 75° to 70° F. and relatively humidity of from 35% to 30%. Preferably the higher humidity limit corresponds to the higher temperature and the lower humidity limit to the lower temperature. The sudden cooling of the lumped masses as the same are discharged into the air conditioned chamber results in a hardening or embrittling action of the candy film coatings upon the individual cereal grains and this action evidences itself in a crackling and a separation of the individual particles from each other. Thereupon, the separately coated cereal grains are raked to discharge chutes leading to packaging funnels, whereat operators are stationed to fill receptacles with the candy coated cereal. Preferably these receptacles assume the form of waterproof Cellophane bags, the closed ends of which are heat sealed and the open ends of which are sealed by an operator after the filling of the cereal grains therewith. The hermetic seals afforded by these bags do not constitute a part of the present invention. These packages are then boxed and crated for shipment to the ultimate consumer who receives the product prepared in accordance with the invention in a form which is highly palatable, crisp and tasty, and beneficial as a nutritious food.

The present invention is realized by the use of a bran-covered puffed wheat having a moisture content of less than 7 to 8%. If the original puffed wheat normally produced with a moisture content of 3 to 4% is exposed to extremely humid atmosphere so that the limit above is exceeded, re-crisping the puffed wheat is necessary before practicing the present invention. In the case of preparing a candy coated hard glazed puffed rice, the upper moisture limit of this cereal grain must not exceed approximately 2%, in order that it may combine effectively with the hardenable candy coating.

It is understood that the ingredients entering into the candy composition described above may be compounded in any suitable quantities in the approximate proportions set forth above. These ingredients are set forth below, with the proportion thereof based upon the starting ingredients of the candy formula.

| | Per cent |
|---|---|
| 1 qt. water | 8.1 |
| 20 lbs. cane sugar | 81.3 |
| 2 lbs. honey | 8.1 |
| 6 oz. acetic acid | 1.5 |
| 2 oz. sodium acetate | 0.5 |
| 2 oz. salt | 0.5 |
| Total 394 oz | 100.0 |

Puffed cereal, 14 lbs. or 224 oz__ 57% of the candy ingredients

While the ingredients and proportions above have been found most satisfactory, the invention lends itself to variation and the scope of the invention is to be construed by the limits of the appended claims.

I claim:

1. The method of preparing candy coated puffed cereal which comprises preparing a candy solution containing cane sugar, honey, acetic acid and sodium acetate, heating said solution to a temperature of from 310° to 340° F., adding said hot candy solution to a batch of puffed cereal grains having a moisture content of less than 8%, agitating said mass for a short period of time to coat said cereal grains with a thin film of the candy solution, and directly discharging the lumped masses into an air conditioned chamber having a temperature lower than 75° F. and a relative humidity lower than 35% to cause an embrittling of the coatings upon the individual grains and a consequent separation therebetween.

2. The method of preparing candy coated puffed cereal which comprises preparing a candy solution containing cane sugar, honey, acetic acid and sodium acetate, heating said solution to a temperature of from 310° to 340° F. corresponding to low and high humidity conditions, respectively, of the surrounding atmosphere, adding said hot liquid candy solution to a batch of puffed cereal grains having a moisture content of less than 8%, agitating said mass less than two minutes to coat said cereal grains with a thin film of the candy solution, and directly discharging the lumped masses into an air-conditioned chamber having a temperature lower than 75° F. and a relative humidity lower than 35% to cause an embrittling of the coatings upon the individual grains and a consequent separation therebetween.

3. The method of preparing candy coated bran-covered puffed wheat of elongated form, which comprises preparing a candy solution containing cane sugar, honey, acetic acid and sodium acetate, heating said solution to a temperature of from 310° to 340° F. corresponding to low and high humidity conditions, respectively, of the surrounding atmosphere, adding said hot candy solution to a batch of the puffed wheat having a moisture content of less than 8%, agitating said combined mass less than two minutes to coat said puffed wheat grains with a thin film of the candy solution with minimum breaking of the grains, and directly discharging the lumped masses into an air conditioned chamber having a temperature range from 75° to 70° F. and a corresponding relative humidity of 35% to 30%, to cause an embrittling of the coatings upon the individual grains and a consequent separation therebetween.

4. The method of preparing candy coated puffed rice which comprises preparing a candy solution containing cane sugar, honey, acetic acid and sodium acetate, heating said solution to a temperature of from 310° to 340° F. corresponding to low and high humidity conditions, respectively, of the surrounding atmosphere, adding said hot candy solution to a batch of the puffed rice having a moisture content of less than 2%, agitating said combined mass less than two minutes to coat said puffed rice grains with a thin film of the candy solution with minimum breakage of the grains, and directly discharging the lumped masses into an air conditioned chamber having a temperature range from 75° to 70° F. and a relative humidity of 35% to 30% to cause an embrittling of the coatings upon the individual grains and a consequent separation therebetween.

5. The method of preparing candy-coated puffed wheat which comprises preparing a hardenable candy solution by mixing approximately 81% of granulated cane sugar based upon the weights of the starting ingredients, approximately 8% of amber honey, approximately 1.5% of acetic acid and 0.5% of sodium acetate, approximately ½% of table salt and 8% of water, stirring and heating said mixture for approximately 20 minutes to bring the candy solution to a temperature ranging from 310° to 340° F. corresponding to low and high humidity conditions, respectively, of the surrounding atmosphere, adding the heated candy solution in ribbon form to approximately 57% of bran-covered puffed wheat of elongate form having a moisture content of less than 8%, calculated with respect to the weights of the starting ingredients of the candy solution, agitating the mixture for less than two minutes to rapidly coat the individual grains of puffed wheat with the candy solution, and discharging the still hot lumped masses of the candy coated grains following the mixture thereof into an air conditioned chamber maintained at a temperature of from 75° to 70° F. and relative humidity 35% to 30%, to cause a hardening of the candy coating and a separation of the lumped masses into individually coated puffed wheat grains.

6. The method of preparing candy-coated puffed wheat which comprises preparing a candy solution by mixing about 20 pounds of granulated cane sugar, about 2 pounds of amber honey, about 6 ounces of acetic acid, about 2 ounces of sodium acetate and about 2 ounces of salt in one quart of water, heating said mixture for approximately 20 minutes to bring the candy solution to a temperature ranging from 310° F. to 340° F. corresponding to low and high humidity conditions, respectively, of the surrounding atmosphere, adding the heated candy solution in ribbon form to approximately 14 pounds of bran-covered puffed wheat of elongate form having a moisture content of less than 8%, agitating the mixture simultaneously with the addition of the candy solution thereto and for less than two minutes thereafter to rapidly coat the individual grains of puffed wheat with the candy solution with minimum breakage of the puffed wheat grains, and discharging the lumped masses of the candy coated grains following the mixture thereof into an air conditioned chamber maintained at a temperature of from 75° to 70° F. and relative humidity 35% to 30% to cause a hardening of the candy coating and a separation of the lumped masses into individually coated puffed wheat grains.

7. The method of preparing candy-coated puffed wheat by combining a bran-covered puffed wheat of elongate form with a hardenable candy coating therefor in the approximate proportions set forth below which comprises preparing a candy solution by mixing about 20 pounds of granulated cane sugar, about 2 pounds of amber honey, about 6 ounces of acetic acid, about 2 ounces of sodium acetate and 2 ounces of table salt in one quart of water, heating said mixture for approximately 20 minutes to bring the candy solution to a temperature ranging from 310° F. to 340° F. corresponding to low and high humidity conditions, respectively, of the surrounding atmosphere, adding the heated candy solution in ribbon form to approximately 14 pounds of bran-covered puffed wheat of elongate form having a moisture content of less than 8%, and simultaneously agitating the mixture for 1 to 1½ minutes to rapidly coat the individual grains of puffed wheat with the candy solution, and discharging the still hot lumped masses of the candy coated grains following the mixture thereof into an air conditioned chamber maintained at a temperature of from 75° to 70° F. and relative humidity of 35% to 30% to cause a hardening of the candy coating and a separation of the lumped masses into individually coated puffed wheat grains.

8. The method of preparing candy-coated puffed rice which comprises preparing a hardenable candy solution by mixing approximately 81% of granulated cane sugar based upon the weights of the starting ingredients, approximately 8% of amber honey, approximately 1.5% of acetic acid and 0.5% of sodium acetate crystals, approximately ½% of table salt and 8% of water, stirring and heating said mixture for approximately 20 minutes to bring the candy solution to a temperature ranging from 310° to 340° F. corresponding to low and high humidity conditions, respectively, of the surrounding atmosphere, adding the heated candy solution in ribbon form to approximately 57% of hard glazed puffed rice having a moisture content of less than 2%, calculated with respect to the weights of the starting ingredients of the candy solution, agitating the mixture for less than two minutes to rapidly coat the individual grains of puffed rice with the candy solution, and discharging the still hot lumped masses of the candy coated grains following the mixture thereof into an air conditioned chamber maintained at a temperature of from 75° to 70° F. and relative humidity 35% to 30%, to cause a hardening of the candy coating and a separation of the lumped masses into individually coated puffed rice grains.

JAMES S. REX.